(12) United States Patent
Jacobson et al.

(10) Patent No.: US 8,227,939 B2
(45) Date of Patent: Jul. 24, 2012

(54) RECONFIGURABLE MULTI-CELL POWER CONVERTER

(75) Inventors: Boris S. Jacobson, Westford, MA (US); Evgeny N. Holmansky, Acton, MA (US)

(73) Assignee: Raytheon Company, Waltham, MA (US)

( * ) Notice: Subject to any disclaimer, the term of this patent is extended or adjusted under 35 U.S.C. 154(b) by 392 days.

(21) Appl. No.: 12/586,009

(22) Filed: Sep. 16, 2009

(65) Prior Publication Data
US 2010/0314937 A1 Dec. 16, 2010

Related U.S. Application Data

(60) Provisional application No. 61/268,338, filed on Jun. 11, 2009.

(51) Int. Cl.
*H02J 9/00* (2006.01)
*H02M 7/10* (2006.01)

(52) U.S. Cl. ............................................ 307/82; 363/68
(58) Field of Classification Search .................. 307/82; 363/68, 69, 65
See application file for complete search history.

(56) References Cited

U.S. PATENT DOCUMENTS

| | | |
|---|---|---|
| 3,867,643 A | 2/1975 | Baker et al. |
| 5,625,545 A | 4/1997 | Hammond |
| 5,864,475 A | 1/1999 | Ikawa et al. |
| 5,933,339 A | 8/1999 | Duba et al. |
| 5,986,909 A | 11/1999 | Hammond et al. |
| 6,218,792 B1 | 4/2001 | Berth et al. |
| 6,370,047 B1 * | 4/2002 | Mallory ........................... 363/65 |
| 6,704,825 B1 | 3/2004 | Lascu et al. |
| 6,737,763 B2 * | 5/2004 | Liu et al. ........................... 307/58 |
| 7,049,796 B2 | 5/2006 | Cherniski et al. |
| 7,212,419 B2 * | 5/2007 | Vinciarell ........................ 363/65 |
| 2008/0174926 A1 | 7/2008 | Evans et al. |

OTHER PUBLICATIONS

Architecture for a High-to-Medium-Voltage Power Converter: High Input Voltage Would be Divided Evenly Among Many Converter Blocks. *Nasa's Jet Propulsion Laboratory*, Pasadena, CA, NASA Tech Briefs, May 2008, www.techbriefs.com, (2 pages total).

Ayyanar, Raja; Ramesh Gin; and Ned Mohan. Active Input-Voltage and Load-Current Sharing in Input-Series and Output-Parallel Connected Modular DC-DC Converters Using Dynamic Input-Voltage Reference Scheme. *IEEE Transactions on Power Electronics*, vol. 19, No. 6, Nov. 2004, pp. 1462-1473 (12 pages total).

(Continued)

*Primary Examiner* — Michael Rutland Wallis
(74) *Attorney, Agent, or Firm* — Daly, Crowley, Mofford & Durkee, LLP (57) ABSTRACT

A reconfigurable multi-cell power converter and method wherein a set of cells are connected between an input bus and a load in an input series output parallel configuration or in an input parallel output series configuration. Each cell includes a primary side reconfigurable between series and parallel operation and a secondary side also reconfigurable between series and parallel operation. Switching circuitry is configured to reconfigure the primary side of each cell between series and parallel operation and vice versa and also to reconfigure the secondary side of each cell between series and parallel operation and vice versa. A controller is configured to actuate the switching circuitry depending a voltage on the input bus and/or cell condition to reconfigure all the cell primary sides and/or secondary sides while maintaining a desired input series output parallel or input parallel output series connection for the set of cells.

29 Claims, 4 Drawing Sheets

OTHER PUBLICATIONS

Choudhary, Vijay; Enrique Ledezma; Raja Ayyanar, and Robert M. Button. Fault Tolerant Circuit Topology and Control Method for Input-Series and Output-Parallel Modular DC-DC Converters. *IEEE Transactions on Power Electronics*, vol. 23, No. 1, Jan. 2008, pp. 402-411 (10 pages total).

Giri, Ramesh; Vijay Choudhary; Raja Ayyanar; and Ned Mohan. Common-Duty-Ratio Control of Input-Series Connected Modular DC-DC Converters With Active Input Voltage and Load-Current Sharing. *IEEE Transactions on Industry Applications*, vol. 42, No. 4, Jul./Aug. 2006, pp. 1101-1111 (11 pages total).

Krishnamurthy, Harish K.; and Raja Ayyanar. Building Block Converter Module for Universal (AC-DC, DC-AC, DC-DC) Fully Modular Power Conversion Architecture. *Power Electronics Specialist Conference, PESC—2007. IEEE*, Orlando, FL., Jun. 17-21, 2007, pp. 483-489 (7 pages total).

* cited by examiner

RECONFIGURABLE MULTI-CELL POWER CONVERTER

RELATED APPLICATIONS

This application hereby claims the benefit of and priority to U.S. Provisional Application Ser. No. 61/268,338, filed on Jun. 11, 2009 under 35 U.S.C. §§119, 120, 363, 365, and 37 C.F.R. §1.55 and §1.78.

FIELD OF THE INVENTION

The subject invention relates to power converters.

BACKGROUND OF THE INVENTION

Power converters are used to convert power from an input bus connected to a power source for a load. Power converters may be designed to convert a fixed AC input voltage into a variable voltage and/or variable frequency output. Other converters are designed to convert an AC input to DC. Still others convert a DC input at one voltage to another voltage. The architecture chosen may provide for high frequency operation, pulse-width-modulation, transformer isolation, and the like. Many power converters include a number of cells also called blocks or modules.

Depending on input and output voltage/current requirements (high voltage, low current or low voltage, high current), the input and output sides of the converter cells can be connected in series or parallel.

In general, four combinations of the cell input/output connection are possible: Input Series Output Series (ISOS), Input Series Output Parallel (ISOP), Input Parallel Output Parallel (IPOP), and Input Parallel Output Series (IPOS). Among those four, ISOP and IPOS architectures are more commonly adopted, since they provide inherent voltage and current sharing between the cells.

It should be noted that three out of four architectures employ series cell connection. Since series-connected cells share the same current, fault isolation in case of a single or multiple cell failure is difficult. Typically, converter operation has to be interrupted to disconnect and/or replace failed cell(s).

Also, in case of a cell failure, the remaining cells have to sustain higher operating voltage and/or current. While the high current condition can be mitigated by shedding non-critical loads, reducing input and output voltage is usually not possible.

The mechanical arrangement of high voltage converter assemblies with replaceable cells presents additional challenges particularly in applications with limited space. One prior design includes cells with grounded cases connected in series across the input bus. While this approach simplifies multi-module construction and improves assembly flexibility, each cell has to sustain the full bus voltage from the components to the chassis resulting in an increase in size and weight.

Power converter equipment relies on various methods of grounding to ensure safety and to control transient processes resulting from ground faults. One prior approach describes multiple identical modules series-connected across the input and a direct connection between the input return of the high voltage stack and chassis ground. While this technique accords simple fault detection and isolation since a ground fault becomes equivalent to a short circuit, it increases current stress for the semiconductors used in the cells. The housings of all the cells are grounded to allow simple installation and replacement, but the cell has to sustain the full working voltage from the components to the chassis.

An alternative technique uses grounding of the center point of the cell stack through a high resistance to ground to maintain the center point at zero potential under normal conditions. This method reduces the insulation requirements for the input components thereby allowing more efficient use of space but it does not provide the optimal solution because all of the components on the secondary side have to be insulated from the chassis to sustain 50% of the working voltage.

BRIEF SUMMARY OF THE INVENTION

In some examples, a modular, multi-cell power converter preferably includes a dual-converter cell architecture which enables simple cell reconfiguration in response to a change of operating conditions or a cell failure and, if necessary—safe, simple, and fast isolation and replacement of a failed cell.

This new power converter, in one specific embodiment, includes cells with dual converters on the primary side, dual converters on the secondary side, and switching circuitry which allows the input side and the output side dual converters to be independently reconfigured from a series to a parallel and from parallel to series connection. Another function of the switching circuitry is to isolate and/or bypass a failed cell to allow uninterrupted converter operation and is especially suitable for converters with series cell connection.

In one aspect, a modular, multi-cell, high voltage power converter utilizes a stackable mechanical assembly which reduces voltage isolation requirements between the cells and the overall size of the high voltage power converter. Also, dynamic grounding means can be included to reduce voltage stress on series-connected cells in the event of a single or multiple cell failure.

The subject invention also features, in one aspect, a modular, multi-cell power converter with a specific cell mechanical implementation which includes a fixed input section, a fixed output section, and a removable section. This mechanical implementation aids in safe, simple, and fast removal/replacement of a failed cell without interrupting the converter operation and is especially suitable for converters with series cell connection.

Finally, a control algorithm can be included to implement a specific sequence for the cell switching circuitry to enable reconfiguration of the input side and the output side dual converters from series to parallel and from parallel to series connection in response to a change of operating conditions or a cell failure and, if necessary—isolation and replacement of a failed cell.

In one example, a reconfigurable multi-cell power converter comprises a set of cells connected between an input bus and a load in an input series output parallel configuration or an input parallel output series configuration. Each cell in this specific example includes a primary side reconfigurable between series and parallel operation and a secondary side also reconfigurable between series and parallel operation. Switching circuitry is configured to reconfigure the primary side of each cell between series and parallel operation and vice versa and to reconfigure the secondary side of each cell between series and parallel operation and vice versa. A controller is configured to actuate the switching circuitry depending on a voltage on the input bus and/or cell condition to reconfigure all the cells primary sides and/or secondary sides while maintaining a desired input series output parallel or input parallel output series connection for the set of cells.

The set of cells may be connected input series output parallel, and if the voltage on the input bus is a first, higher voltage, then the controller actuates the switching circuitry so that the primary side of each cell is configured for series operation and the secondary side of each cell is configured for parallel operation. When the set of cells are connected input series output parallel and the voltage on the input bus is a second, lower voltage, then the controller actuates the switching circuitry so that the primary side of each cell is configured for parallel operation and the secondary side of each cell is configured for series operation. In still another example, the primary side of the cells are initially configured for parallel operation and the controller, in response to a cell failure or a failure of multiple cells, actuates the switching circuitry to reconfigure the primary sides of the cells for series operation.

In one preferred embodiment, each cell includes first and second converters on the primary side and third and fourth converters on the secondary side. The first and second converters may be series resonant converters and the second and third converters may be rectifiers. The switching circuitry may include switches selectively connecting an output of the first converter to an input of the second converter and an output of the third converter to an input of the fourth converter for series operation. The output of the first converter is disconnected from the input of the second converter and the output of the third converter is disconnected from the input of the fourth converter for parallel operation.

In one embodiment, each cell includes a fixed input section connected to the input bus, a fixed output section, and a removable section between and electrically and mechanically coupled to the fixed input and fixed output sections. The fixed input section may include first and second input bus terminals and first and second connectors electrically connected to the first and second input bus terminals, respectively. The removable section typically includes first and second primary side connectors removeably connectable to the first and second connectors of the fixed input section, respectively. Similarly, the fixed output section may include first and second output terminals and first and second connectors electrically connected to the first and second output terminals, respectively. The removable section then includes first and second secondary side connectors removeably connectable to the first and second connectors of the fixed output section, respectively. The removable section secondary side may include a first switch connected to the first connector of the secondary side and a second switch connected to the second connector of the secondary side. The first and second switches are closed for normal operation and opened to allow removal of the removable section. Further included may be a lock mechanism releasably engaging the removable section. Also the fixed input section may include a selectively closeable switch connected across the first and second input bus terminals. Each cell may also include current limiting means selectively actuatable to limit the inrush current during the converter startup or cell reconfiguration. Typically, the controller is configured to actuate the current limiting means before actuating the switching circuitry to reconfigure the cells. In one example, the current limiting means includes a resistor and a switch connected across a resistor.

Finally, the primary side of each cell preferably floats with respect to ground and the secondary side of each cell is connected to ground.

One reconfigurable cell for a power converter features a primary side including first and second converters, a secondary side including third and fourth converters, primary side switching circuitry selectively connecting an output of the first converter to an input of the second converter, and secondary side switching circuitry selectively connecting an output of the third converter to an input of the fourth converter. For higher voltage operation, the primary side converters are connected in series and the secondary side converters are connected in parallel. For lower voltage operation, the primary side converters are connected in parallel and the secondary side converters are connected in series or parallel.

In another aspect a cell for a power converter is featured. One cell includes at least first and second converters and switching circuitry selectively connecting an output of the first converter to an input of the second converter for serial operation and disconnecting the output of the first converter from the input of the second converter for parallel operation.

One power converter in accordance with the subject invention features a set of cells between an input and a load. Each cell is reconfigurable between different modes of operation. Switching is circuitry configured to reconfigure each cell. A controller is configured to actuate the switching circuitry in response to a voltage level on the input bus and/or cell condition to reconfigure the cells.

A method of operating a multi-cell power converter is featured including a set of reconfigurable cells connectable between an input and a load. One preferred method includes detecting a change in the voltage on the input bus and/or an inoperable cell. In response to a lower input bus voltage, each cell is reconfigured to an input parallel configuration. In response to a higher input bus voltage and/or an inoperative cell, each cell is reconfigured to an input series configuration.

BRIEF DESCRIPTION OF THE SEVERAL
VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
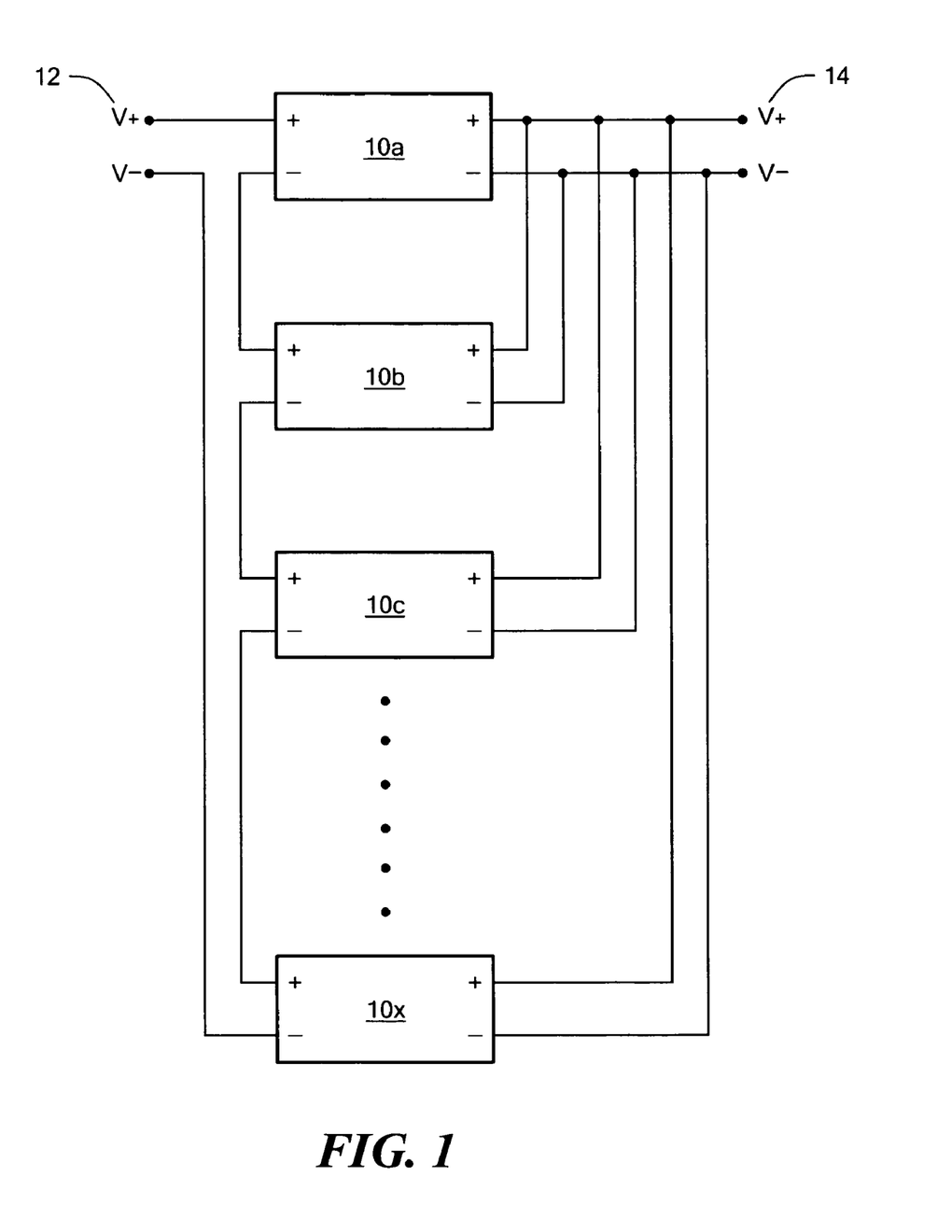
FIG. 1 is a highly schematic block diagram showing an example of a power converter architecture in accordance with the subject invention.

FIG. 1 shows an example of a reconfigurable multi-cell power converter in accordance with an example of the subject invention. At the converter level, a set of cells 10a-10x are connected between input bus 12 and output bus or load 14 in an input series output parallel (ISOP) configuration (shown) or, alternatively, an input parallel, output series (IPOS) or other configuration. See *Common-Duty-Ratio Control of Input-Series Connected Modular DC-DC Converters With Active Input Voltage and Load-Current Sharing*, IEEE Transactions on Industry Applications, Vol. 42, No. 4 (July/August 2006), pp. 1101-1111, incorporated herein by this reference.

Ideally, cells 10a-10x can be reconfigured from the ISOP configuration or IPOS configuration to any of four possible configurations, in response to a change of operating conditions or a cell failure and the subject invention is capable of such modes of operation. Reconfiguration at the converter level may be impractical since a complex switching network and a complex system-level controller may be required to maintain voltage/current sharing between the cells for all configurations.

Figure 2:
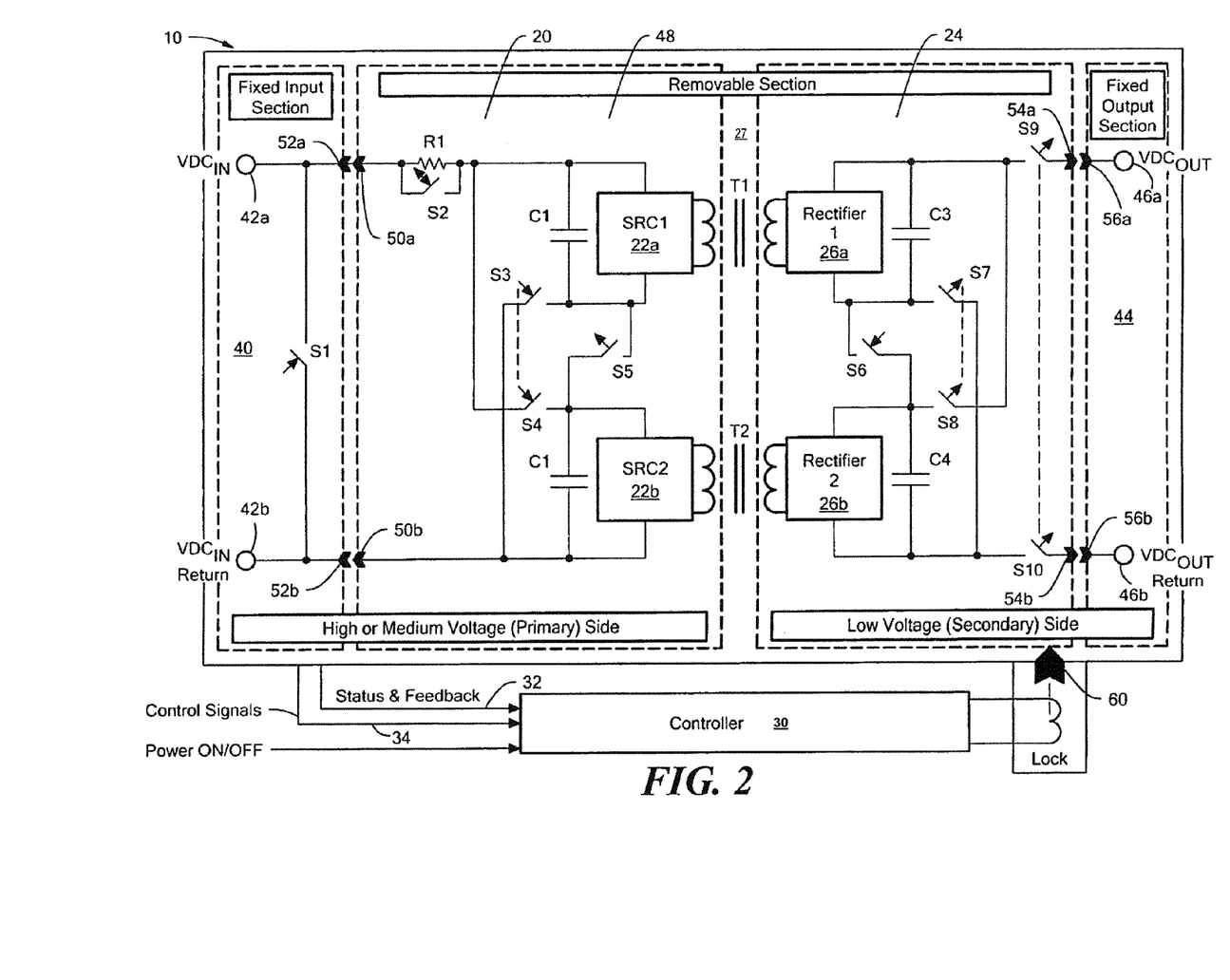
FIG. 2 is a schematic circuit diagram showing an example of an individual power converter cell in accordance with the subject invention.

The subject invention, in one specific version, proposes a dual-converter cell architecture which enables simple cell reconfiguration in response to a change of operating conditions or a cell failure and, if necessary—safe, simple, and fast isolation and replacement of a failed cell. FIG. 2 shows one proposed dual-converter cell architecture.

Although the specific design of the cells 10a-10x may vary, FIG. 2 shows an example of cell 10 with primary side 20 including two series resonant converters (SRC) 22a and 22b, switches S1-S5, and current limiting resistor R1. Nodes 50a and 50b are the input nodes of cell 10. One terminal of converter 22a is connected to node 50a and one terminal of converter 22b is connected to node 50b. Secondary side 24, in this particular example, includes two converters 26a and 26b (in this particular example represented by rectifiers) with switches S6-S10, coupled to SRCs 22a and 22b respectively via transformers T1 and T2 via isolation barrier 27 (which is also referred to herein as isolation boundary 27 and insulation barrier 27). Nodes 54a and 54b are output nodes of the cell. One terminal of rectifier 26a is connected to node 54a and one terminal of rectifier 26b is connected to node 54b.

For series operation of primary side 20, switches S3 and S4 are closed and switch S5 is open. For parallel operation of primary side 20, switches S3 and S4 are open and switch S5 is closed. For normal operation of primary side 20 (either series or parallel), switch S1 is open and switch S2 is closed.

For series operation of secondary side 24, switch S6 is closed and switches S7 and S8 are open. For parallel operation of secondary side 24, switch S6 is open and switches S7 and S8 are closed. For normal operation of secondary side 24 (either series or parallel), switches S9 and S10 are closed.

Switch S2 and current limiting resistor R1 perform function of pre-charging bus capacitors C1, C2 during initial converter setup. Switch S1 serves as an important function of bypassing the primary bus current flowing through the series-connected cells prior to cell reconfiguration or isolation. Switch S1 is closed immediately preceding the cell reconfiguration or disconnection, effectively short-circuiting the corresponding cell. This allows uninterrupted flow of the primary current through the remaining cells and protects the subject cell from a destructive over voltage stress caused by current interruption in a series-connected stack. Immediately after the cell reconfiguration or replacement, switch S1 is opened, allowing for normal cell operation. If the cell is disconnected without replacement, switch S1 remains closed, allowing for normal operation of the remaining cells.

This switching circuitry (e.g., switches S1-S10) then, allows reconfiguration of the dual converters in any cell to any of four configuration described above (ISOS, ISOP, IPOP, or IPOS). In the given example, all cells retain ISOP configuration (FIG. 1) at the converter level, irrespective of the internal cell configuration. Controller 30 is configured to activate switches S3-S8 as desired for specific conditions via control signal path 34.

For example, status and feedback signals on path 32 may indicate the voltage on the input bus and/or cell condition. Controller 30 is responsive to these signals. If cell 10 is presently configured for IPOS operation but the voltage on the input bus raises to a level higher than a predetermined voltage, controller 30 may activate switches S3-S8 for cell ISOS or ISOP operation. If the input bus voltage lowers later in time, controller 30 detects this event and activates switches S3-S8 for cell IPOS or IPOP operation. If later in time one or more cells fail, controller 30 detects this event and activates switches S3-S8 for cell ISOS or ISOP operation.

This dynamic reconfiguration capability extends the input voltage range for the multi-cell converter and enhances graceful degradation. Dual converters in the individual cells may be connected in series for a high operating voltage but reconnected in parallel for lower voltage operation. In the event of a cell failure, reconfiguration of the dual converters in remaining cells from parallel to series allows the converter cabinet to continue operation at a reduced power level but without increasing the voltage stress on individual cells. The converter, in the preferred embodiment, is able to maintain the optimum operating range even in the event of multiple cell failures. The dynamically reconfigured converter also enables operation from a number of bus voltages without modification which reduces the total cost of equipment ownership.

In one specific example, the reconfiguration capability extends the input voltage range for the complete converter and enhances graceful degradation. Individual cell primary side converters 22a, 22b and secondary side converters 26a, 26b in a cell 10 are connected in series for a high input voltage but are reconnected in parallel for a lower input voltage. In the event of a cell failure, reconfiguration of the remaining cells from parallel to series allows for a higher operating voltage. To reconfigure a cell, two input nodes 50a and 50b that carry average current at low frequency are switched using conventional vacuum relays with minimal impact on input line and load voltage.

Consider an example with eight cells all connected in series at the converter level where the SRC converters 22a and 22b are connected in parallel. The voltage across each SRC is 750 volts, the voltage across each cell is 750 volts, the power per cell is 125 KW, and the total output power is 1,000 KW.

If one cell fails, the cells remain connected in series, the SRCs are reconnected in parallel, the voltage across each SRC is now 857 volts and the voltage across each cell is now 857 volts, the power per remaining cell is 125 KW but the total output power is 875 KW. Now consider two cells failing. The cells are still connected in series, but, as discussed above, the SRCs are reconnected from parallel to series. The voltage across each SRC is now 500 volts, the voltage across each cell is 1,000 volts, the power per cell is 125 KW, and the total output power is 750 KW.

Another feature of the subject invention, in one preferred embodiment, is that cell 10 includes fixed input section 40 connected to the input bus via terminals 42a and 42b. Fixed output section 44 is hard wired to the output bus via terminals 46a and 46b. Input section 40 typically forms a part of the higher level mechanical assembly (e.g., the cabinet) and output section 44 is typically hard-wired to the output bus.

Fixed input section 40 preferably also includes a switch, such as crowbar switch S1 across bus terminals 42a and 42b. Controller 30 activates switch 62 to close via path 34 to shunt removable section 48 prior to removal. The result is safe and efficient "hot swapping" of the individual cells. The ability to perform hot swapping on failed modules serves to reduce the mean time to repair. Moreover, the proposed approach enables uninterrupted converter operation in the event of a cell failure by shunting the failed cells while maintaining continuous current flow for the remaining cells.

Removable section 48 is between and electrically and mechanically coupled to both fixed input section 40 and fixed output section 44. Removable section 48 includes dual SRCs 22a and 22b, dual rectifiers 26a and 26b, isolation boundary 27, transformers T1 and T2, and switches S2-S10. Primary side connectors 50a and 50b releasably mate with fixed input connectors 52a and 52b, respectively. Connectors 50a and 50b are connected to the SRCs and the switching circuitry of the primary side as shown. Connectors 52a and 52b are electrically connected to input terminals 42a and 42b and crowbar switch S1.

Similarly, secondary side 24 includes connectors 54a and 54b which releasably mate with fixed output section connectors 56a and 56b, respectively. Connectors 54a and 54b are connected to the switching circuitry and rectifiers of the secondary side as shown through switches S9 and S10 activated manually and/or by controller 30 via path 34. Connectors 56a and 56b are connected to fixed output section terminals 46a and 46b as shown. For normal operation, switch S1 is open and switches S9 and S10 are closed. For removal of removable section 48, switch S1 is closed and switches S9 and S10 are opened. Lock mechanism 60 may also be provided and activated by controller 30 as shown to releasably engage moveable section 48 to prevent inadvertent removal of it from the surrounding hardware such as the cabinet rails or modules.

This three-section construction allows "hot swapping" or replacement of a failed cell without deenergizing the input and/or output busses causing interruption of power delivery.

To enable cell reconfiguration while power is present on the input bus, the subject invention features cells with current limiting means selectively activatable to inhibit the primary side in a standby condition. One example of such current limiting means is switch S2 across resistor R1. Controller 30 is programmed to activate the current limiting switch before activating the switching circuitry (S3-S8) to reconfigure the cells. Crowbar switch S1, switches S2-S8, and resistor R1 enable cell reconfiguration without interruption of power. Resistor R1 limits the source current under transient conditions involving a step-change across input filter capacitors C1 and C2.

The switches discussed herein may be implemented using semiconductor or electromechanical devices. Controller 30 provides the reconfiguration functions discussed herein and in addition may be configured to perform voltage, current, and power regulation, monitoring, protection, interfacing, and other functions generally associated with convention power converters.

Figure 3:
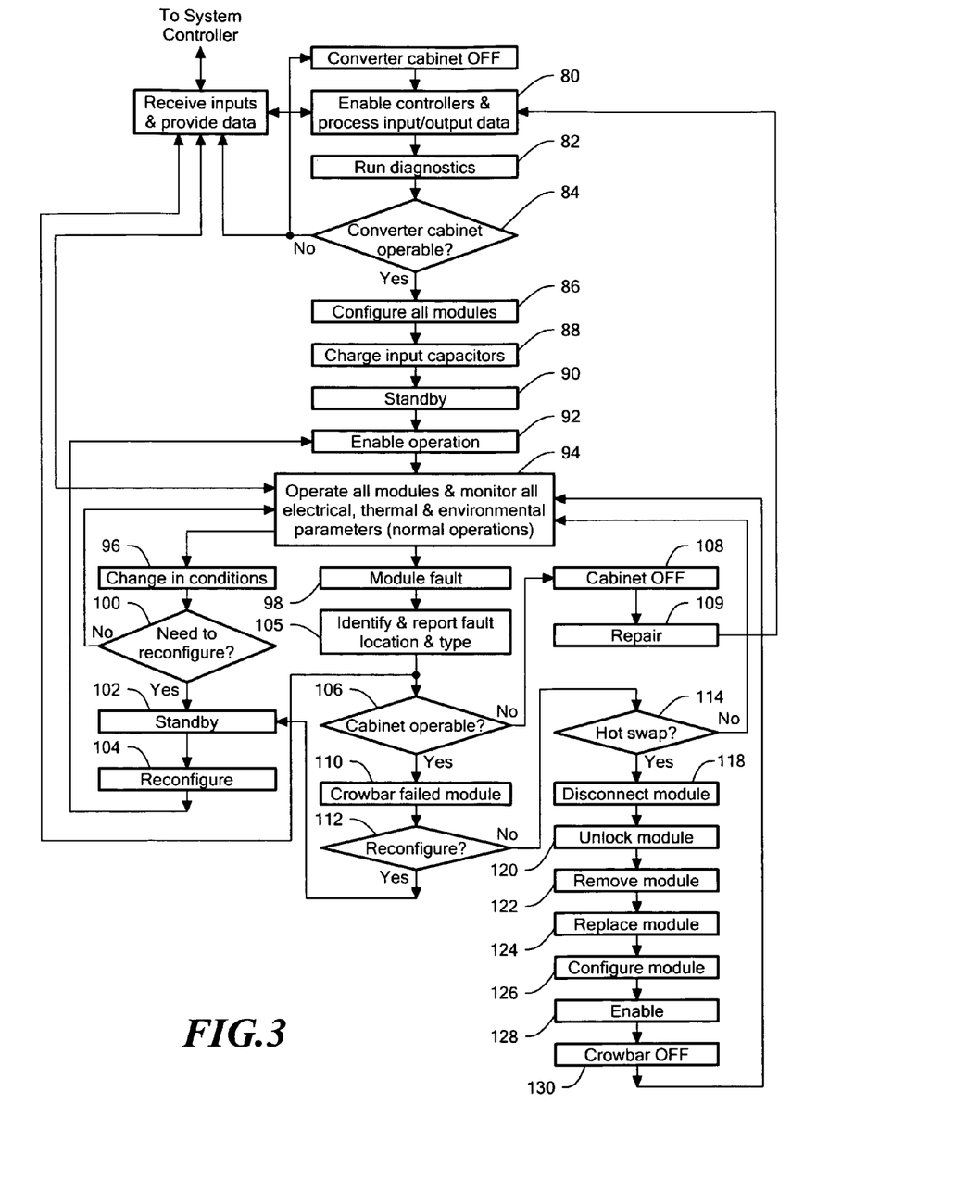
FIG. 3 is a flow chart depicting the primary steps associated with an example of the programming of the controller shown in FIG. 2.

FIG. 3 shows the primary steps associated with programming the controller 30 of FIG. 2. Initially, the converter is in the off state. When the converter and cell controllers are enabled, they process and store input commands and other data from the system level controller, step 80, run diagnostic procedures, step 82, and report the converter and cells status, step 84. If the converter is not operable, the converter controller returns the converter to the off state. If the converter is operable, the converter controller makes an assessment of the operating conditions (e.g., input voltage and current, output voltage and current, and voltage ranges in continuous and dynamic operation) and the system-level controller commands and configures the cells, step 86, for optimum performance. Regardless of the internal cell connection type, it is typical that all of the cells are connected in series on the primary side and in parallel on the secondary side or vice versa to maintain ISOP or IPOS architecture at the converter level. For high voltage or medium voltage applications, the ISOP converter level connection is preferred. When configuration of the converter is completed, the input power is applied, step 88. During charge up of the input capacitors (C1 and C2, FIG. 2), switch S2, FIG. 2 is opened allowing resistor R1 to limit the source current. When the input capacitors for all the cells are fully charged, switch S2 is closed and the converter is switched into the standby state, step 90, FIG. 3, discussed above. In this standby state, the converter is ready to deliver power, but these SRC converters are inhibited and no power is delivered to the load.

Once the controller enables the cells to supply power, step 92, the controller begins normal operation of the converter, step 94. During operation of the converter, it is possible that either a change in operating conditions or a signal output from a higher level system controller may require reconfiguration, step 96. It is also possible that there has been a failure or one or more cells, step 98. In the case of a required change in condition, the controller evaluates the operating conditions and determines whether cell reconfiguration is necessary, step 100. If the cell reconfiguration is necessary, the controller issues the standby command step 102, reconfigures the cells as discussed above, step 104 and the converter resumes normal operation, step 92.

In the case of a failure of one or more cells, the controller reports the condition, step 105, and determines if the converter with the remaining cells is still operational, step 106. The controller typically makes this assessment considering a variety of electrical and environmental factors. One decision that should be included is the ability of the remaining cells to support the input bus voltage. If the converter is not operable, the controller outputs a signal to turn off the input power, step 108, and requests repair, step 109. If the converter is operable, the controller activates the crowbar switch, step 110. At this point, the algorithm branches in two paths depending upon the operating conditions and the system requirements: reconfiguration, step 112 and hot swapping, step 114.

If reconfiguration is sufficient to maintain the load power requirements, the controller commands the cabinet to standby, step 102, reconfigures the cells, and the converter resumes normal operation as discussed above. If hot swapping is desired, switches S9 and S10, FIG. 2, are turned off, either automatically by the controller or by a service person, electrically disconnecting the cell from the energized output bus, step 118, FIG. 3. Then, the service person unlocks the modules step 120, replaces the module, step 124 whereupon configuration again occurs, step 126 to enable the system, step 128 and then the crowbar switch turned off, step 130.

Figure 4:
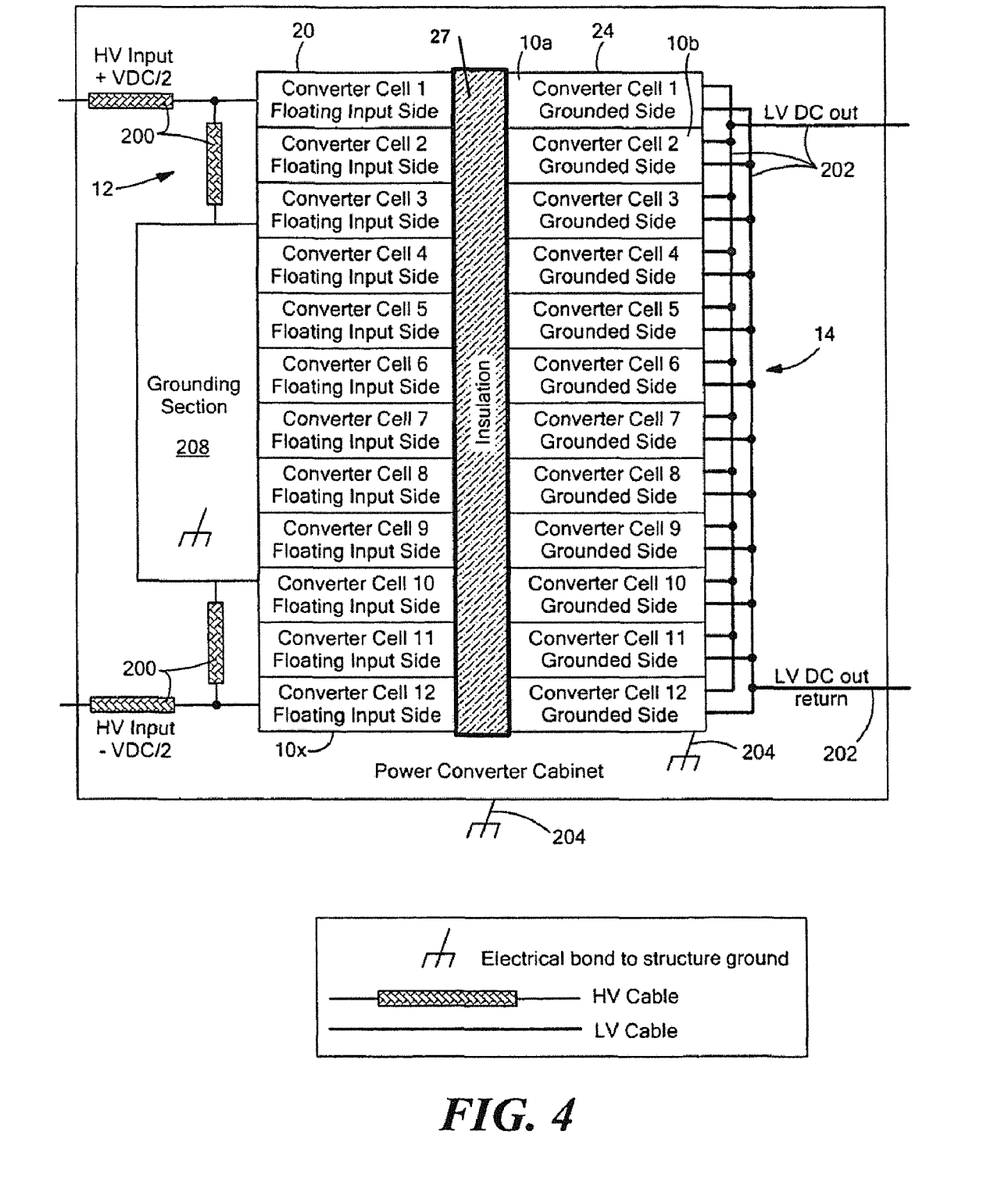
FIG. 4 is a schematic block diagram showing another example of a power converter architecture with a floating stack construction in accordance with an example of the subject invention.

FIG. 4 shows, in one embodiment, that the chasses of the cells primary (high voltage) side 20 and secondary side 24 are separated by an insulation barrier 27. Chasses of the cells primary side 20 are "floating," and have no connection to structure ("Earth") ground. Chasses of the cells secondary side 24 are bounded to structure ground. Lines 200 depict high voltage cables and lines 202 depict low voltage cables. An electrical bond to structure ground is shown at 204. In this way, the electrical potential of the primary side of each cell may vary with respect to structure ground. In the event of a cell failure, electrical potentials will be redistributed between the remaining cells without increasing the voltage difference between the adjacent cells.

This preferred architecture allows implementing different grounding schemes for primary (high voltage) side, while reducing voltage stress between the cell internal components and chassis.

The result, in any embodiment, is a reconfigurable power converter cell, an optional hot swapping cell architecture, and an optional new cabinet level grounding technique. However, although specific features of the invention are shown in some drawings and not in others, this is for convenience only as each feature may be combined with any or all of the other features in accordance with the invention. Also, the words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A reconfigurable multi-cell power converter comprising:
a set of cells connected between an input bus and a load in an input series output parallel configuration or an input parallel output series configuration;
each cell including a primary side with at least two power converters reconfigurable between series and parallel operation, and a secondary side with at least two power converters reconfigurable between series and parallel operation;
switching circuitry configured to reconfigure the primary side power converters of each cell between series and parallel operation and vice versa and to reconfigure the secondary side power converters of each cell between series and parallel operation and vice versa; and
a controller configured to actuate the switching circuitry depending on a voltage on the input bus and/or cell condition to reconfigure all the cells primary sides and/or secondary sides while maintaining a desired input series output parallel or input parallel output series connection for the set of cells.

2. The power converter of claim 1 in which the set of cells is connected input series output parallel, the voltage on the input bus is a first, higher voltage and, in response, the controller is configured to actuate the switching circuitry so that on the primary side of each cell the power converters are configured for series operation and on the secondary side of each cell the power converters on the secondary side of each cell are configured for parallel or series operation.

3. The power converter of claim 1 in which the set of cells are connected input series output parallel, the voltage on the input bus is a second, lower voltage and, in response, the controller is configured to actuate the switching circuitry so that on the primary side of each cell the power converters are configured for parallel operation and on the secondary side of each cell the power converters are configured for series or parallel operation.

4. The power converter of claim 1 in which, on the primary side of the cells, the power converters are initially configured for parallel operation and the controller, in response to a cell failure or a failure of multiple cells, is configured to actuate the switching circuitry to reconfigure the primary side for series operation.

5. The power converter of claim 1 in which each cell includes first and second converters on the primary side and third and fourth converters on the secondary side.

6. The power converter of claim 1 in which the primary side converters are series resonant converters and the secondary side converters are rectifiers.

7. The power converter of claim 1 in which the cell primary side has first and second input nodes, a first node of a first primary side converter is connected to the first input node of the cell, a second node of the second converter is connected to the second input node of the cell, and the switching circuitry includes switches selectively connecting a second node of the first converter to a first node of the second converter for series operation, and for parallel operation, disconnecting the second node of the first converter from the first node of the second converter and connecting the second node of the first converter to the second input node of the cell and the first node of the second converter to the first input node of the cell.

8. The power converter of claim 5 in which the cell secondary side has first and second output nodes, a first node of the third converter is connected to the first output node of the cell, a second node of the fourth converter is connected to the second output node of the cell, and the switching circuitry includes switches selectively connecting a second node of the third converter to a first node of the further converter for series operation and, for parallel operation, disconnecting the second node of the third converter from the first node of the fourth converter and connecting the second node of the third converter to the second node of the cell and the first node of the fourth converter to the first node of the cell.

9. The power converter of claim 1 in which each cell includes a selectively closeable switch connected across first and second input nodes of the cell, the switch open for normal operation and closed to allow the cell bypassing for reconfiguration or in case of cell failure.

10. The power converter of claim 1 in which each cell includes a fixed input section connected to the input bus, a fixed output section, and a removable section between and electrically and mechanically coupled to the fixed input and fixed output sections.

11. The power converter of claim 10 in which the fixed input section includes first and second input bus terminals and first and second connectors electrically connected to the first and second input bus terminals, respectively.

12. The power converter of claim 11 in which the removable section includes first and second primary side connectors removeably connectable to the first and second connectors of the fixed input section, respectively.

13. The power converter of claim 10 in which the fixed output section includes first and second output terminals and first and second connectors electrically connected to the first and second output terminals, respectively.

14. The power converter of claim 13 in which the removable section includes first and second secondary side connectors removeably connectable to the first and second connectors of the fixed output section, respectively.

15. The power converter of claim 14 in which the removable section secondary side includes a first switch connected to the first connector of the secondary side and a second switch connected to the second connector of the secondary side, the first and second switches closed for normal operation and open to allow removal of the removable section.

16. The power converter of claim 10 further including a lock mechanism releasably engaging the removable section.

17. The power converter of claim 11 in which the fixed input section includes a selectively closeable switch connected across the first and second input bus terminals, the switch open for normal operation and closed to allow removal of the removable section.

18. The power converter of claim 1 in which each cell includes current limiting means selectively actuatable to limit inrush current during converter initial startup and during cell reconfiguration.

19. The power converter of claim 18 in which the controller is configured to actuate the current limiting means before converter initial startup and before actuating the switching circuitry to reconfigure the cells.

20. The power converter of claim 19 in which said current limiting means includes a resistor and a switch connected across the resistor.

21. The power converter of claim 1 in which the primary side and secondary side of each cell are separated by an insulation barrier, the primary side of each cell floats with respect to ground, and the secondary side of each cell is connected to ground.

22. A reconfigurable multi-cell power converter comprising:
a set of cells connected between an input bus and a load;
each cell including a primary side reconfigurable between series and parallel operation, and a secondary side reconfigurable between series and parallel operation;
switching circuitry configured to reconfigure the primary side between series and parallel operation and vice versa and to reconfigure the secondary side between series and parallel operation and vice versa; and
a controller configured to actuate the switching circuitry to reconfigure all the cells primary sides and/or secondary sides.

23. A reconfigurable cell for a power converter, the cell configured to be in operable communication with a controller, the reconfigurable cell comprising: a primary side including first and second converters;
a secondary side including third and fourth converters;
primary side switching circuitry in operable communication with the controller wherein the primary side switching circuitry is responsive to a signal from the controller actuating the primary side switching circuitry to selectively connect the first converter and the second converter in series and in parallel; and
secondary side switching circuitry in operable communication with the controller wherein the secondary side switching circuitry is responsive to a signal from the controller actuating the secondary side switching circuitry selectively connect the third converter and the fourth converter in series and in parallel.

24. The cell of claim 23 further including a fixed input section, a fixed output section, and a removable section between and electrically and mechanically coupled to the fixed input and fixed output sections.

25. A power converting comprising:
a set of cells between an input and a load, each respective cell having a respective input and a respective output that are each individually and internally reconfigurable between different modes of operation, the modes including series operation and parallel operation;
first switching circuitry responsive to a first signal from a controller to individually reconfigure the respective input and/or the respective output of each cell;
second switching circuitry responsive to a second signal from the controller to individually bypass a respective cell so as to enable reconfiguration or removal of the respective cell; and
a controller configured to provide a first signal to actuate said first switching circuitry in response to a first predetermined voltage level on the input and/or cell condition to individually reconfigure the at least one input or output of at least one of the cells and further configured to provide a second signal to individually bypass a respective cell if, based on a second predetermined voltage level on the input and/or the cell condition, it is necessary to reconfigure or remove the respective cell.

26. A method of operating a multi-cell power converter including a set of reconfigurable cells connectable between an input and a load, the method comprising:
detecting a change in the voltage on the input and/or an inoperable cell;
if the input bus voltage is lower than a first predetermined level, reconfiguring at least one cell in the set of reconfigurable cells to either input parallel output series (IPOS) configuration or input parallel output parallel (IPOP) configuration;
if the input bus voltage is higher than a second predetermined level, reconfiguring at least one cell in the set of reconfigurable cells to either input series output series operation (ISOS) or input series output parallel operation (ISOP); and
if one of the cells in the set of cells is inoperative, reconfiguring the inoperative cell for either ISOS or ISOP operation.

27. A method of operating a multi-cell power converter including a set of reconfigurable cells connectable between an input and a load, in which each cell includes a primary side with at least two converters and a secondary side with at least two converters the method comprising:
detecting a change in the voltage on the input and/or an inoperable cell;
in response to a lower input bus voltage, reconfiguring each cell to an input parallel configuration; and
in response to a higher input bus voltage and/or an inoperative cell, reconfiguring each cell to an input series configuration.

28. The method of claim 27 in which there is switching circuitry between the two primary side converters and between the two secondary side converters and reconfiguring includes activating the switching circuitry.

29. The method of claim 26 in which each cell includes a removable section.

* * * * *